United States Patent [19]

Kondo

[11] 4,106,353

[45] Aug. 15, 1978

[54] DEVICE FOR MOVING CURVED PLATE BENT IN A SUBSTANTIALLY ARCUATE-SHAPE ALONG CURVED PATH

[75] Inventor: Osamu Kondo, Aichi, Japan

[73] Assignee: Toyota Jidosha Kogyo Kabushiki Kaisha, Aichi, Japan

[21] Appl. No.: 676,959

[22] Filed: Apr. 14, 1976

[30] Foreign Application Priority Data

Aug. 13, 1975 [JP] Japan ........................ 50-98689

[51] Int. Cl.[2] ........................ F16H 21/18

[52] U.S. Cl. ........................ 74/45; 49/227; 74/89.18

[58] Field of Search ........................ 49/351, 227; 74/45, 74/89.18

[56] References Cited

U.S. PATENT DOCUMENTS

| | | | |
|---|---|---|---|
| 2,552,671 | 5/1951 | Floraday | 49/351 |
| 2,798,761 | 7/1957 | Himka | 49/227 |
| 3,072,395 | 1/1963 | Pickles | 49/351 |
| 3,803,762 | 4/1974 | Abeel et al. | 49/227 |

FOREIGN PATENT DOCUMENTS

| | | | |
|---|---|---|---|
| 1,139,644 | 2/1957 | France | 49/227 |
| 1,420,684 | 1/1976 | United Kingdom | 49/227 |

*Primary Examiner*—Benjamin W. Wyche
*Assistant Examiner*—Wesley S. Ratliff, Jr.
*Attorney, Agent, or Firm*—Pollock, Vande Sande & Priddy

[57] ABSTRACT

A device for moving a curved plate bent in a substantially arcuate-shape along a curved path, in which a lift arm pivotably supported on a pivot is operatively connected at one end thereof to a lift arm bracket having a bent end portion in such a relationship that the extension line of the bent end portion of the lift arm bracket makes an acute angle with the axis of the pivot supporting the lift arm. Due to the fact that the lift arm is connected to the bent end portion of the lift arm bracket by means of a guide pin which is guided in a predetermined direction along a slot provided in the bent end portion of the lift arm bracket and the extension line of the bent end portion of the lift arm bracket makes the acute angle, namely an angle less than 90° with the axis of the pivot supporting the lift arm, the end of the lift arm connected to the lift arm bracket can also make arcuate movement not only in the direction perpendicularly intersecting the thickness of the curved plate but also in the direction of the thickness of the plate, and therefore, the curved plate moved in a predetermined direction with the movement of the lift arm can be guided along the curved path of the guide runs without imparting any stress to the device.

5 Claims, 8 Drawing Figures

DEVICE FOR MOVING CURVED PLATE BENT IN A SUBSTANTIALLY ARCUATE-SHAPE ALONG CURVED PATH

BACKGROUND OF THE INVENTION

1. Field of the Invention

This invention relates to a device for moving, along a curved path, a curved plate bent in a substantially arcuate-shape or of part-cylindrical cross section such as a curved window glass used in a door of vehicles or a curved door disposed on a curved surface of a cylindrical container to openably close an opening, and more particularly to a device of the kind above described by which there is no undesirable stress tending to cause deformation of the device itself during movement of the curved plate along the curved path.

2. Description of the Prior Art

It is the present tendency to extensively employ a curved window glass bent in a substantially arcuate-shape in automotive vehicles. In a prior art curved plate moving device used for causing vertical movement of a curved window glass along a curved path, a door frame having the curved path of special shape is generally employed to restrict the movement of the curved window glass so that the window glass can make arcuate movement according to the predetermined curved path along which the window glass is to be guided. However, such a prior art curved plate moving device or so-called window regulator presently used in this field is generally constructed to make linear movement during lifting and lowering the window glass by a lift arm. Thus, the lift arm in the prior art window regulator is constructed to be capable of elastic deformation or a play of some degree is provided in the connections between various component elements of the window regulator, so that the window glass can make the required arcuate movement along the curved path provided in the door frame. In such a construction, however, a transverse force to or a force in a direction of thickness of the curved glass is inevitably imparted to the glass-runs or the curved path guiding the window glass due to the difference in direction of motion between the window glass making the arcuate movement and the window regulator making the linear movement. Therefore, the prior art construction is defective in that this transverse force to the curved glass gives rise to not only undesirable deformation or wear of the glass-run but also undesirable deformation of the window regulator, resulting in difficulty of effecting smooth and reliable operation of the window regulator. Such construction is also applied presently to a device for moving a curved door disposed on a curved surface of a cylindrical container for openably closing an opening of the container and has a defect similar to that above described.

SUMMARY OF THE INVENTION

It is an object of the present invention to provide a novel and improved device for moving a curved plate bent in a substantially arcuate-shape or of part-cylindrical cross section such as a curved window glass in a door of a vehicle along a curved path.

In the curved plate moving device according to the present invention, arm means arranged for swinging movement around a pivot and arm bracket means fixedly connected to curved plate holding means are formed at one end thereof with bent portions, respectively, substantially parallel with each other and apart from a curved plate, and the bent portion of the arm bracket means is disposed in such a relationship that its extension line makes an acute angle with the centerline or axis of the pivot supporting the arm means. The bent portion of the arm means is operatively connected to the bent portion of the arm bracket means by guide means which is movable along a guide path arranged in the bent portion of the arm bracket means when swinging movement of the arm means takes place around the pivot. Due to the above arrangement, the locus drawn by the end of the arm means operatively connected to the arm bracket means includes not only a moving component in the direction perpendicularly intersecting the thickness of the curved plate but also a moving component in the transverse direction or direction of the thickness of the curved plate. Thus, when the moving component in the transverse direction of the curved plate is suitably selected, it is possible to prevent the component elements of the moving device from being subject to undesirable deformation or wear during movement of the curved plate. Therefore, the device according to the present invention can stably operate trouble-free over a very long period of time. While the curved plate moving device of the present invention is applicable to all kinds of structures adapted for moving a curved plate, for example, a window regulator for vehicles having a curved window glass, a door opening device for a structure having a door movable along a cylindrical surface of a cylinder, and the like, the present invention is especially most suitable for application to a window regulator for use in vehicles. Therefore, an application of the present invention to such window regulator is illustrated in the accompanying drawings and referred to in the specification. It is apparent, however, that the present invention is in no way limited to such specific application.

Another object of the present invention is to provide a curved plate moving device which is composed of relatively simple parts and is light in weight and inexpensive. In the device according to the present invention, means for transmitting motion or rotation of a rotary shaft to the arm means comprises an inexpensive pinion and an inexpensive light-weight gear in plate form so that motion can be satisfactorily transmitted from the rotary shaft to the arm means without using expensive and heavy parts such as bevel gears.

Still another object of the present invention is to provide a practical and useful structure of the curved plate moving device which can smoothly and reliably operate. According to this structure, the arm means is arranged to operate in a manner similar to a pantograph so that the curved plate can be moved from one position to another in parallel relation.

DETAILED DESCRIPTION OF THE PRIOR ART

First, one form of the prior art window regulators will be described with reference to FIGS. 1 and 2 for better understanding of the present invention.

Figure 1:
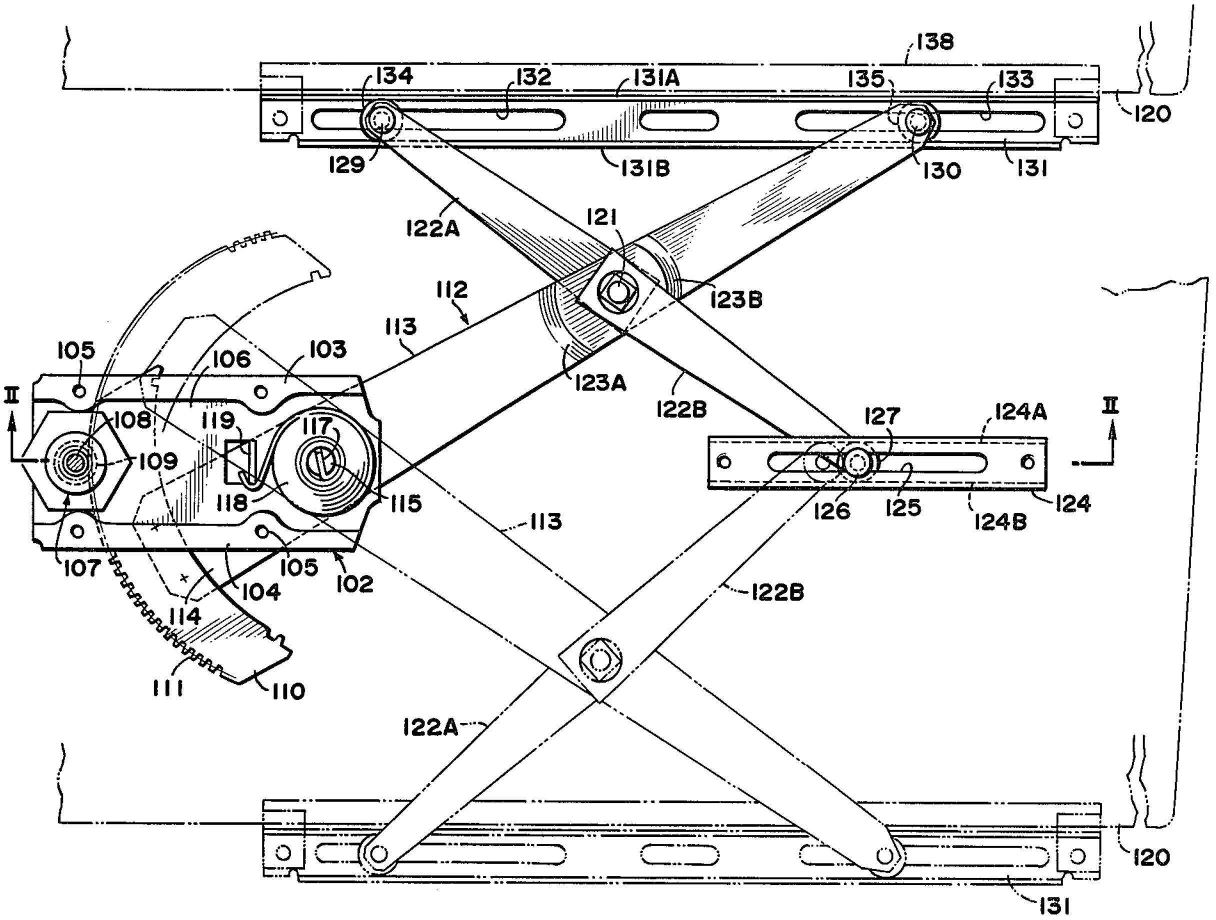
FIG. 1 PRIOR ART
FIG. 1 is a front elevational view showing the structure of a prior art curved plate moving device.
Figure 2:
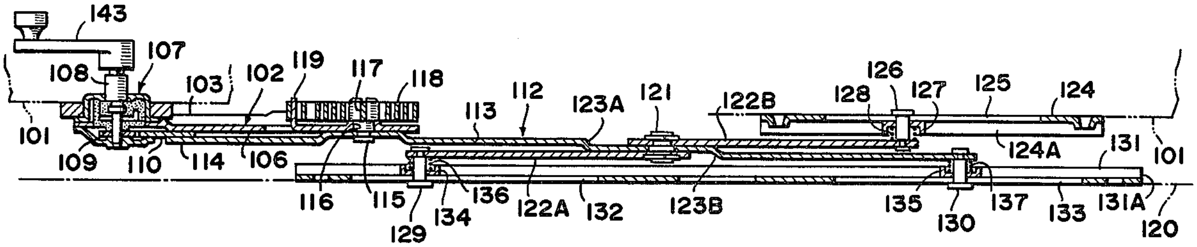
FIG. 2 PRIOR ART
FIG. 2 is a sectional view taken along line II—II of FIG. 1 when a lift arm bracket is situated in the middle of the stroke.

Referring to FIGS. 1 and 2, this prior art window regulator comprises a regulator base 102 which is formed from a plate of material such as steel by working with a press. This regulator base 102 is fixed to the inner surface of an inner panel 101 of a door of a vehicle by conventional fixing means such as screws. The upper and lower edge portions 103 and 104 of this regulator base 102 in FIG. 1 are provided with a plurality of holes 105 for receiving conventional screws (not shown) therein, and a recess 106 is formed between these edge portions 103 and 104 of the regulator base 102. A bearing mechanism 107 comprising a conventional bearing is disposed at one end of this recess 106. A rotary shaft 108 is connected to a regulator handle 143 (FIG. 2) and is rotatably journaled in this bearing mechanism 107. A pinion 109 is fixedly mounted on the lower end of this rotary shaft 108 to make meshing engagement with a driven gear 110. This driven gear 110 is sector wheel of plate made of steel or like material which is toothed at the outer peripheral edge thereof as indicated by 111.

This driven gear 110 is fixed or welded at the non-toothed portion thereof by conventional means such as spot welding to one end 114 of a lift arm 113 constituting part of a pantograph-like lifting mechanism 112. A pivot 115 is fixed as by caulking to the lift arm 113 at a point substantially intermediate between said one end 114 and the central portion of the lift arm 113. This pivot 115 is supported rotatably at the lower end portion thereof in a hole 116 bored in the regulator base 102 adjacent to the other end of the recess 106, that is, the end remote from the end having the bearing mechanism 107 thereon. The upper end portion of the pivot 115 protruding from the regulator base 102 has a diameter larger than that of the lower end portion supported in the hole 116, and a diametrically extending groove 117 is formed on the surface of the upper end of the pivot 115. A flat spiral spring 118 is anchored at one or inner end thereof in this groove 117 and at the other or outer end thereof to a tongue 119 formed by cutting to raise a part of the central portion of the bottom of the recess 106 of the regulator base 102. A curved plate bent in a substantially arcuate-shape, that is, a curved window glass 120 in this case, is connected to the other end of the lift arm 113 by means as described later. Thus, the lift arm 113 is normally urged by the spring 118 in a direction in which it acts to lift the window glass 120 toward the upper position, that is, in a direction in which it swings counter-clockwise around the pivot 115 in FIG. 1.

A connecting shaft 121 is rotatably supported in or extends through the lift arm 113 at a point substantially intermediate between the pivot 115 and the other end remote from the end at which the lift arm 113 is securely fixed to the driven gear 110. A pair of equalizer arms 122A and 122B each having a length substantially half that of the lift arm 113 are fixed at one end thereof to the opposite end portions respectively of the connecting shaft 121 protruding from the lift arm 113. These equalizer arms 122A and 122B are fixed to the connecting shaft 121 by caulking in such a relationship that they extend in directions opposite to each other to align on the same straight line.

The lift arm 113 includes a pair of spaced stepped portions 123A and 123B which are formed respectively by bending the corresponding parts outwardly in relation to the connecting shaft 121 on the opposite sides of the connecting shaft 121 as seen in FIG. 2. Thus, the portion of the lift arm 113 on one side of the connecting shaft 121 lies in the same plane as that of the equalizer arm 122A, and the portion of the lift arm 113 on the other side of the connecting shaft 121 lies in the same plane as that of the equalizer arm 122B. In FIGS. 1 and 2, the base portion or the portion of the lift arm 113 having the pivot 115 lies in the same plane as that of the equalizer arm 122B.

A bracket 124 of substantially C-like cross section for cooperating with the equalizer arm 122B is fixed as by screws to the inner surface of the inner panel 101 in such a relationship that the longitudinal centerline thereof registers with the line connecting between the rotary shaft 108 and the pivot 115 supporting the lift arm 113. This bracket 124 is provided with a longitudinally extending elongated guide slot 125. A guide pin 126 is slidably received at one end thereof in this guide slot 125. The other end of this guide pin 126 is fixed by caulking to the free end of the equalizer arm 122B. A roller 127 is pivoted on this guide pin 126 so as to make free rolling movement between an upper side wall 124A and a lower side wall 124B of the bracket 124. A compression coil spring 128 is interposed or compressed between this roller 127 and the associated end of the equalizer arm 122B. This spring 128, interposed between the roller 127 and the equalizer arm 122B, acts to maintain the roller 127 in pressure contact with the rear side of the bracket 124. Further, this spring 128 permits slight inclination of the pin 126 on the end of the equalizer arm 122B relative to the longitudinal axis of the bracket 124. Therefore, this end of the equalizer arm 122B can be freely horizontally guided in the guide slot 125 of the bracket 124 while permitting slight inclination of the equalizer arm 122B relative to the bracket 124.

Guide pins 129 and 130 similar to the guide pin 126 are also fixed at one end thereof to the free end of the equalizer arm 122A and lift arm 113 respectively by caulking. These guide pins 129 and 130 are respectively slidably received at the other end thereof in longitudinally extending elongated guide slots 132 and 133 formed in spaced apart relation in a lift arm bracket 131. This lift arm bracket 131 has also a substantially C-like cross-sectional shape and is similarly provided with an upper side wall 131A and a lower side wall 131B. Rollers 134 and 135 similar to the roller 127 are pivoted respectively on the guide pins 129 and 130. These rollers 134 and 135 make rolling movement along the longitudinal axis of the guide slots 132 and 133 between the upper and lower side walls 131A and 131B of the lift arm bracket 131. Compression coil springs 136 and 137 similar to the coil spring 128 are interposed or compressed respectively between the pin-carrying end of the equalizer arm 122A and the roller 134 and between the pin-carrying end of the lift arm 113 and the roller 135. Therefore, these ends of the equalizer arm 122A and lift arm 113 can be freely horizontally guided in the respective guide slots 132 and 133 of the lift arm bracket 131 while permitting slight inclination of the equalizer arm 122A and lift arm 113 relative to the lift arm bracket 131. A channel 138 supporting bottom edge portion of the curved window glass 120 is securely fixed as by screws (not shown) to the lift arm bracket 131.

The operation of the prior art window regulator having such a construction will now be described with reference to FIGS. 1 and 2.

In operation, when the regulator handle 143 is rotated counter-clockwise in FIG. 1, the pinion 109 is rotated in the same direction on the rotary shaft 108, and the driven gear 110 engaged by the pinion 109 is rotated in an opposite direction or clockwise. As a result of rotation of this driven gear 110, the lift arm 113 is caused to swing in the same direction or clockwise around the pivot 115. Therefore, the guide pin 130 fixed in the bracket-side end of the lift arm 113 acts to urge the lift arm bracket 131 downward in FIG. 1 while making sliding movement in the guide slot 133 of this bracket 131.

The guide pin 129 fixed to the bracket-side end of the equalizer arm 122A and received in the other guide slot 132 of the lift arm bracket 131 acts to swing the equalizer arm 122A counter-clockwise around the connecting shaft 121 while making sliding movement in the guide slot 132. As a result, the other equalizer arm 122B fixedly connected to the equalizer arm 122A by the connecting shaft 121 swings in the same direction, and the guide pin 126 fixed to the bracket-side end of this equalizer arm 122B makes sliding movement in the guide slot 125 of the equalizer arm bracket 124.

Due to the above movement, the lift arm 113 and the equalizer arm pair 122A, 122B are successively shifted in pantograph-like manner from the position shown by the solid lines in FIG. 1 toward the overlapping position at which the angle therebetween is zero. Then, these arms 113 and 122 are shifted toward the position shown by the two-dot chain lines in FIG. 1. Due to such movement or so-called pantograph-like movement of these arms 113 and 122, the lift arm bracket 131, hence the glass channel 138 securely fixed to this bracket 131 can be continuously moved in the state in which it is maintained in horizontal position. During the clockwise swinging movement of the lift arm 113, hence during the downward movement of the window glass 120, the flat spiral spring 118 anchored at one end thereof to the pivot 115 is wound in the energy accumulating direction thereby alleviating the torque that may be required later for turning the regulator handle 143 in the opposite direction to cause upward movement of the window glass 120.

According to such prior art construction, however, the lift arm bracket 131 engaged by the pin-carrying ends of the lift arm 113 and equalizer arm 122A in the pantograph-like lifting mechanism 112 moves along a straight path, whereas the window glass 120 of curved shape or part-cylindrical cross section moves along a curved path, and a stress tending to cause distortion of these parts is imparted to the window regulator. The prior art window regulator has therefore been defective in that repeated upward and downward movement of the window glass 120 results frequently in undesirable deformation and wear of various parts thereby giving rise to difficulty of effecting smooth vertical movement of the window glass 120.

DESCRIPTION OF PRESENTLY PREFERRED EMBODIMENTS

Figure 5:
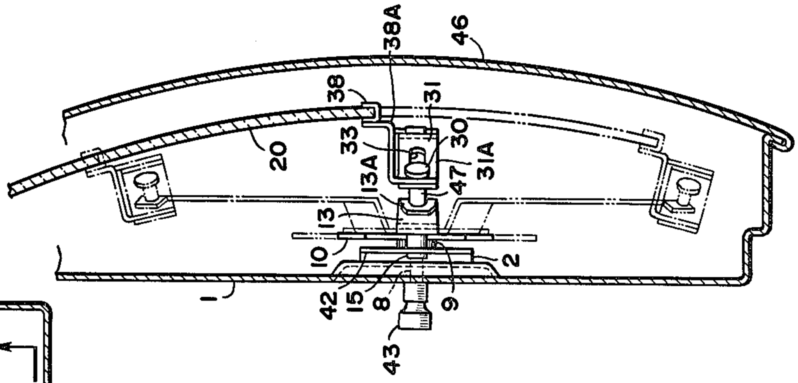
FIG. 5 is a sectional view taken along line V—V of FIG. 3.
Figure 3:
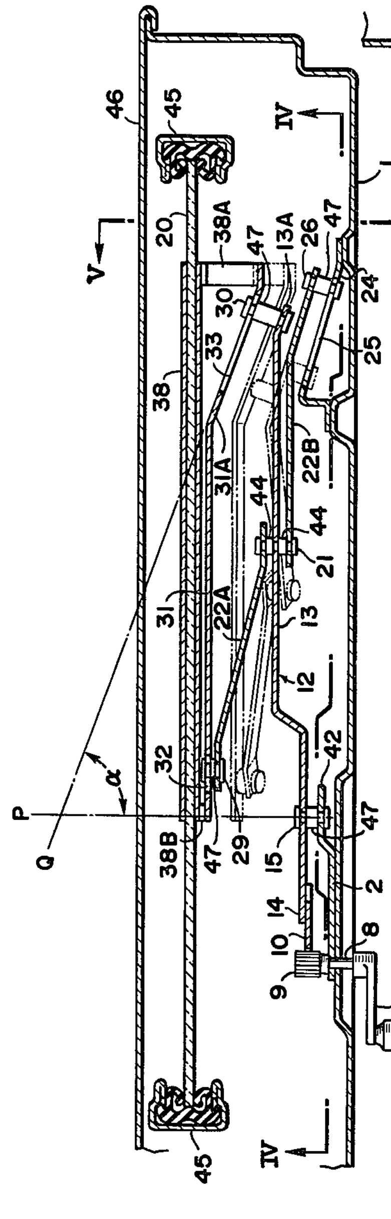
FIG. 3 is a sectional view taken along line III—III of FIG. 4 showing the structure of an embodiment of the curved plate moving device according to the present invention.
Figure 4:
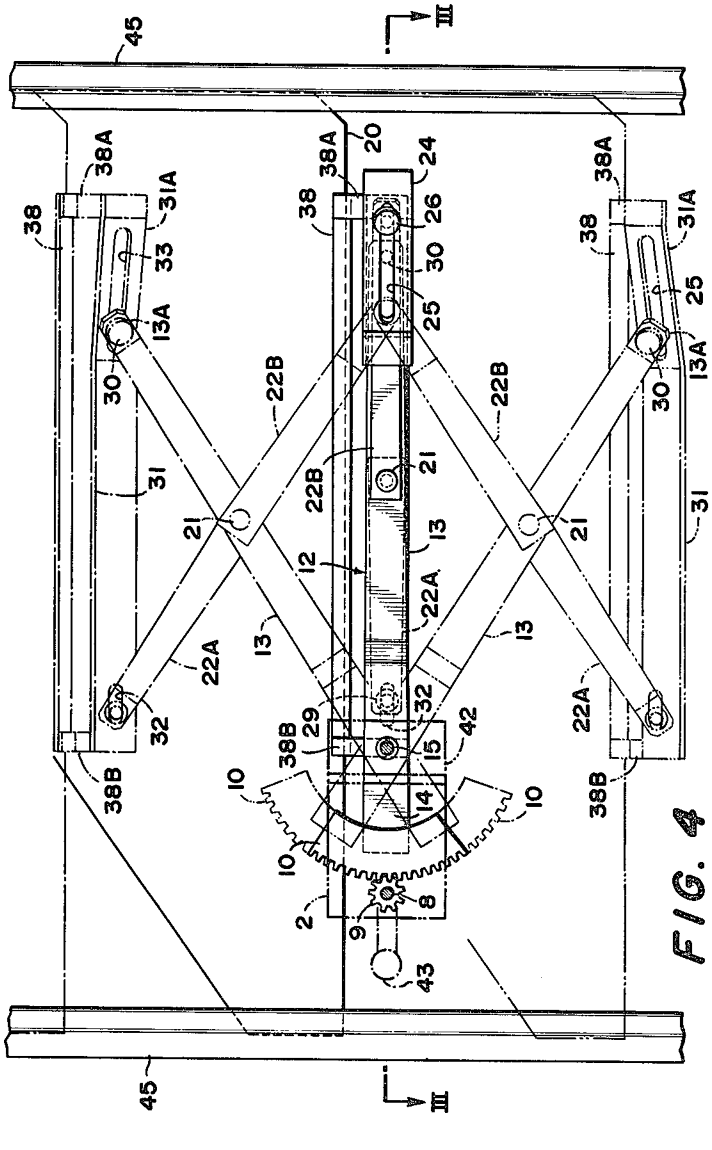
FIG. 4 is a front elevational view taken along line IV—IV of FIG. 3, with an inner panel and an outer panel being omitted for clarification of illustration of the drawing.

The present invention which obviates the prior art defect pointed out hereinbefore will now be described in detail with reference to FIGS. 3 to 8. FIGS. 3 to 5 show a preferred embodiment of the curved plate moving device of the present invention when applied to a window regulator for moving a curved window glass bent in a substantially arcuate-shape or of part-cylindrical cross section used in a door of a vehicle.

Referring to FIGS. 3 to 5, the window regulator embodying the first preferred form of the present invention comprises a regulator base 2 which is formed from a plate of steel or the like. This regulator base 2 is fixed by conventional fixing means such as spot welding to the inner surface of an inner panel 1 which is a basic member of a door of a vehicle. One end portion of this regulator base 2 is bent to extend in parallel with the inner surface of the inner panel 1 to provide a stepped portion 42, and a lift arm 13 constituting part of a pantograph-like lifting mechanism 12 is swingably supported on a suitable portion of this stepped portion 42 of the regulator base 2 by a pivot 15 which is fixed to the lift arm 13.

A rotary shaft 8, which is freely rotatable, extends through the inner panel 1 and regulator base 2 at a suitable position in the area in which the regulator base 2 is partly superposed on the inner panel 1. A pinion 9 is fixedly mounted on one or inner end portion of the rotary shaft 8 protruding inwardly through the inner panel 1 and regulator base 2, and a regulator handle 43 is firmly fixed to the other or outer end portion of the rotary shaft 8. This pinion 9 is in meshing engagement with a driven gear 10 which is in the form of an arcuate rack plate or a sector of material such as steel toothed at the outer peripheral edge thereof. This driven gear 10 is welded or otherwise fixed to one end 14 of the lift arm 13.

A connecting shaft 21 extends through the lift arm 13 at a point substantially intermediate between the pivot 15 and the other end remote from the end having the driven gear 10 fixed thereto. A pair of equalizer arms 22A and 22B are fixed at one end thereof to the opposite end portions respectively of the connecting shaft 21 protruding from the lift arm 13. These equalizer arms 22A and 22B are fixed to each other by the connecting shaft 21 in such a relationship that they extend in directions opposite to each other to align on the same straight line, so that these equalizer arms 22A and 22B can integrally freely swing relative to the lift arm 13 while being maintained in the parallel relation with each other. A pair of annular spacers 44 are respectively interposed between the confronting surfaces of the lift arm 13 and equalizer arms 22A, 22B connected by the connecting shaft 21 so as to ensure smooth swinging movement of the equalizer arm pair 22A, 22B relative to the lift arm 13.

The free end portion of the equalizer arm 22B in the equalizer arm pair 22A, 22B is bent toward the inner panel 1, and a guide pin 26 is fixed at one end thereof to this end of the equalizer arm 22B. The other end of this guide pin 26 is received slidably in an elongated guide slot 25 extending longitudinally in an equalizer arm bracket 24 fixed to the inner surface of the inner panel 1. This bracket 24 extends in parallel with the bent end portion of the equalizer arm 22B. Guide pins 29 and 30 similar to the guide pin 26 are also fixed at one end thereof to the free end of the other equalizer arm 22A and lift arm 13 respectively. These guide pins 29 and 30 are respectively slidably received at the other end thereof in longitudinally extending elongated guide slots 32 and 33 formed in spaced apart relation in a lift arm bracket 31 adjacent to the opposite ends. These guide pins 29, 30 are adapted for sliding movement through the respective slots 32, 33 in the lateral, not axial, direction. The distance between the connecting shaft 21 and the guide pin 29 is selected to be equal to that between the connecting shaft 21 and the guide pin 30 so that the lift arm bracket 31 can always be maintained in horizontal position.

The pin-carrying end portion 13A of the lift arm 13 is also bent toward the inner panel 1 to extend in parallel with the corresponding bent portion of the equalizer arm 22B, and the guide pin 30 is firmly fixed normal to this bent end portion 13A of the lift arm 13. Further, the associated portion 31A of the lift arm bracket 31 is also bent in parallel with the corresponding bent end portion 13A of the lift arm 13, and the guide slot 33 is formed in this bent portion 31A of the lift arm bracket 31. It will be seen from FIG. 3 that the centerline or axis P of the pivot 15 makes an acute angle $\alpha$ less than 90° with the extension line Q of the bent portion 31A of the lift arm bracket 31 connected to the lift arm 13 for moving a curved plate which is herein a curved window glass 20 bent in a substantially arcuate-shape.

A window glass supporting frame 38 having a channel of C-like cross section is firmly fixed to the lift arm bracket 31 by means of a pair of connection pieces 38A and 38B, and the curved window glass 20 of part-cylindrical cross section is firmly held in this channel. This window glass 20 is guided by glass-runs 45 of conventional structure comprising an elastic member of, for example, rubber covered at opposite sides thereof with a steel sheet. Each glass-run 45 is fixed to the inner panel 1 by suitable conventional means (not shown).

The reference numeral 46 in FIGS. 3 and 5 designates an outer panel of the door of the vehicle. A spacer 47 is disposed around the pivot at connection between the lift arm 13 and the regular base 2 to ensure smooth swinging movement of the lift arm 13 relative to the regulator base 2. Similar spacers 47 are disposed around the guide pins at the connections between the lift arm 13 and the bent portion 31A of the lift arm bracket 31, between the equalizer arm 22A and the lift arm bracket 31, and between the equalizer arm 22B and the equalizer arm bracket 24 for servicing the same purpose.

It will be seen further that the equalizer arm 22A is bent at opposite portions adjacent to both the guide pin 29 and connecting shaft 21 respectively so that the transverse width of the window regulator can be reduced and the glass supporting frame 38 holding the window glass 20 can make predetermined arcuate movement.

The operation of the first embodiment of the present invention will now be described with reference to FIGS. 3 to 5.

In operation, when the regulator handle 43 is turned clockwise in FIG. 4, the rotary shaft 8 is rotated clockwise to cause rotation of the pinion 9 in the same direction, and the driven gear 10 engaged by the pinion 9 is rotated counter-clockwise around the pivot 15. As a result of rotation of the driven gear 10, the lift arm 13 is caused to swing counter-clockwise around the pivot 15. Therefore, the guide pin 30 fixed to the bracket-side end of the lift arm 13 acts to urge the lift arm bracket 31 upward from the position shown by the solid lines in FIG. 4 while making sliding movement toward the inner end, or the left seen in FIG. 4, of the guide slot 33. With this swinging movement of the lift arm 13, the equalizer arms 22A and 22B are urged to swing clockwise around the connecting shaft 21 which connects these equalizer arms 22A and 22B to each other through the lift arm 13. Due to the fact that these arms 13 and 22A, 22B are arranged to make so-called pantograph-like movement, the lift arm bracket 31 is shifted in parallel relation from the position shown by the solid lines toward the position shown by the one-dot chain lines while being maintained in horizontal position.

According to the present invention, the angle $\alpha$ defined between the centerline or axis P of the pivot 15 and the extension line Q of the longitudinal centerline of the guide slot 33 formed in the bent portion 31A of the lift arm bracket 31 to be engaged by the guide pin 30 fixed to the associated end of the lift arm 13 is not 90° but less than 90°, and thus, the lift arm 13 is caused to swing around the pivot 15 in the state in which the bracket-side end of the lift arm 13 is inclined relative to the inner panel 1. On this occasion, in response to the sliding movement of the guide pin 30 in the direction intersecting at right angles with thickness of the window glass 20 within the guide slot 33 formed in the portion of the lift arm bracket 31 inclined relative to the inner panel 1, the bracket-side end of the lift arm 13 makes arcuate movement including movement in the direction of thickness of the glass 20. Therefore, the window glass 20 guided by the glass-runs 45 is caused to make the arcuate movement not only in the direction perpendicularly intersecting the thickness of the window glass 20 but also in the direction of the thickness of the window glass 20 so as to be reliably moved along a predetermined curved path defined by the glass-runs 45. To describe more specifically, assume now that the arm 13 placed at the horizontal position as shown in FIG. 3 rotates upwardly. As the lift arm 13 rotates, the position of the pin's projection on the horizontal plane is gradually moved toward the axis P. Meanwhile, the length of the guide pin 30 between the arm 13 and arm bracket 31 remains unaltered. Since, however, the guide slot 33 for engagement with the pin 30 extends in an acute angle with the axis P, the sliding position of the guide pin in the slot 33 moves laterally (extension Q) of the pin. That is, the supported position of the guide pin 30 in the slot 33, while the window glass 20 moves upwardly and downwardly, moves also in the direction of the axis P (in the direction the lift arm bracket 31 moves toward or apart from the arm 13), so that the variation of distance between the glass channel 38 and lift arm 13 due to the up and down movement of the door glass 20 is accomodated. This action solely assures that the glass 20 can move upwardly along a curved path without imparting any bias or distorting force to the arm 13. Further, in this practice, the end portion of the lift arm 13 where the guide pin 30 is fixed, is bent in substantially parallel to the bent end portion 31A of the lift arm bracket 31. Hence, the guide pin 30 is gradually raised from the initial horizontal position. As viewed in FIG. 3, therefore, it is noted that the length of the pin's projection on a horizontal plane is gradually decreased in such manner that the holding frame 38, while being gradually raised, moves toward the arm. The combined locus obtained by these upward and sidewise movements turns out to be a curved surface similar to that of the window glass 20. Thus, there will be no risk of the lift arm 13 being subjected to a bias or distorting force that would otherwise possibly occur while the window glass 20 moves. In this case, the angle α may be suitably determined so that the arc drawn by the bracket-side end of the lift arm 13 can be made equal to the curvature of the window glass 20.

Figure 6:
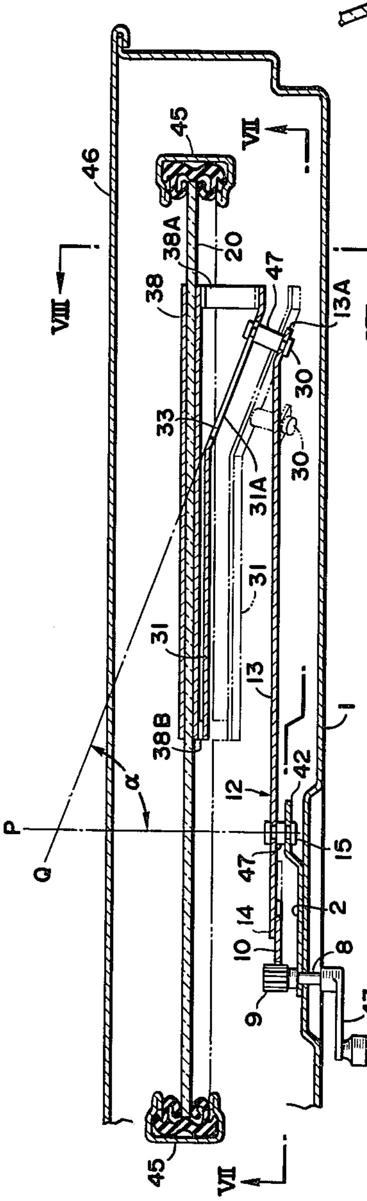
FIG. 6 is a sectional view taken along line VI—VI of FIG. 7 showing the structure of another embodiment of the present invention.
Figure 8:
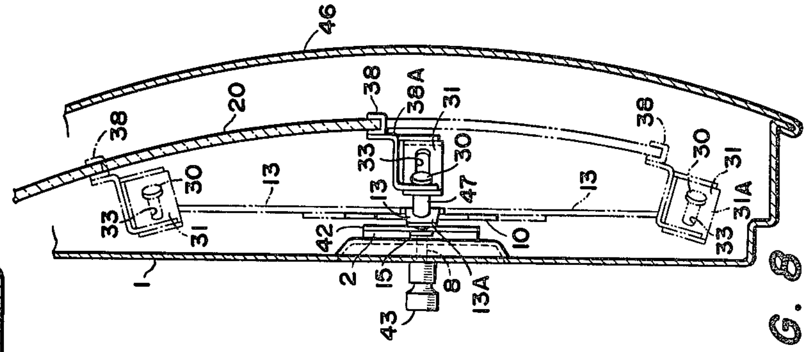
FIG. 8 is a sectional view taken along line VIII—VIII of FIG. 6.
Figure 7:
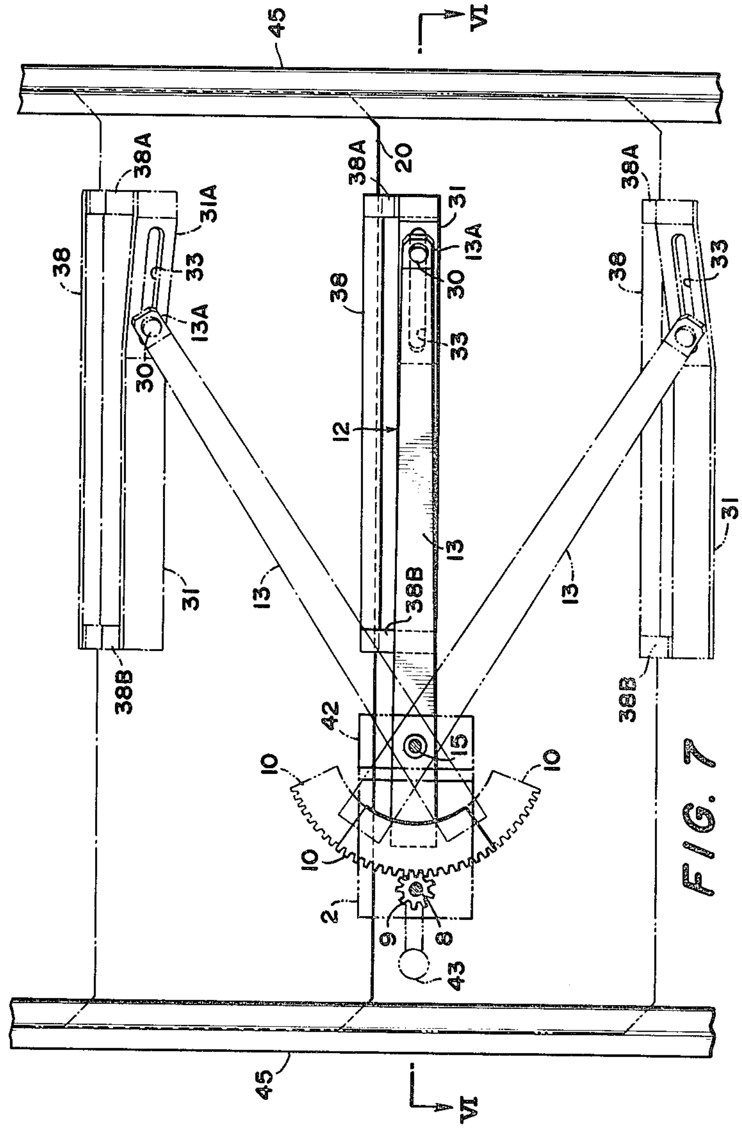
FIG. 7 is a front elevational view taken along line VII—VII of FIG. 6.

Another preferred embodiment of the curved plate moving device of the present invention, when applied to a window regulator for moving a curved window glass bent in a substantially arcuate-shape or of part-cylindrical cross section used in a door of a vehicle, will be described with reference to FIGS. 6 to 8. In FIGS. 6 to 8, the same reference numerals are used to denote the same parts appearing in FIGS. 3 to 5 as this second embodiment is a partial modification of the first embodiment.

This second embodiment is substantially similar to the first embodiment in structure except that the equalizer arms 22A and 22B in the first embodiment are eliminated, and thus, the operation thereof is generally similar to that of the first embodiment. However, due to the elimination of the equalizer arms 22A and 22B, the lift arm bracket 31 in the second embodiment is arranged to move while maintaining its horizontal position by being restricted by the glass-runs 45 holding and guiding the opposite sides of the window glass 20.

It will be seen in FIG. 6 that, in this second embodiment too, the angle α defined between the centerline or axis P of the pivot 15 and the extension line Q of the bent portion 31A of the lift arm bracket 31 connected to the lift arm 13 is not 90° but acute or less than 90°.

The embodiments above described have referred to an application of the present invention to vehicle window regulators. It is apparent, however, that the present invention is in no way limited to such specific embodiments and is similarly effectively applicable to any other devices for moving a curved plate of other material along a curved path, for example, a device for moving a door provided for openably closing an opening formed in a curved surface of a cylindrical container.

I claim:

1. A device for moving a curved plate bent in a substantially arcuate-shape along a curved path comprising:

(a) a base panel;
(b) a curved plate holding frame for holding said curved plate, said frame being disposed in substantially parallel relation and predetermined spaced relation with said base panel;
(c) a rotary shaft rotatably mounted on said base panel;
(d) a pivot mounted on said base panel with the axis thereof disposed parallel with that of said rotary shaft;
(e) arm means pivotably mounted at an intermediate portion thereof on said pivot;
(f) a guide pin protruding laterally from one end of said arm means;
(g) rotation transmission means for transmitting the rotation of said rotary shaft to the other end of said arm means opposite to said one end thereby causing swinging movement of said arm means around said pivot;
(h) arm bracket means secured to said curved plate holding frame and having a portion bent away at a predetermined angle from said curved plate holding frame toward said one end of said arm means, an extension line from said bent portion making an acute angle with the axis of said pivot, said arm bracket means having a guide slot formed at said bent portion and elongated in the direction of said extension line, said guide slot being adapted for guiding said guide pin on said arm means for movement along said slot; and
(i) curved plate guiding means for guiding the curved plate along a predetermined curved path defined thereby, so that as said arm means rotates, said curved plate holding frame is adapted to move substantially parallel to the curvature of the curved plate.

2. A device according to claim 1, wherein said guide pin is fixed on said arm means with said guide pin disposed substantially perpendicular to said guide slot.

3. A device for moving a curved plate bent in a substantially arcuate-shape along a curved path comprising:

(a) a base panel;
(b) curved plate holding frame for holding said curved plate, said frame being disposed in substantially parallel relation and predetermined spaced relation with said base panel;
(c) a rotary shaft rotatably mounted on said base panel;
(d) a pivot mounted on said base panel with the axis thereof disposed in parallel with that of said rotary shaft;
(e) arm means pivotably mounted at an intermediate portion thereof on said pivot, said arm means having a first end portion bent away from said curved plate at a predetermined angle, an extension line from said first end portion making an acute angle with the axis of said pivot;
(f) a guide pin fixed upright on said first end portion of said arm means;
(g) rotation transmission means for transmitting the rotation of said rotary shaft to the other end of said arm means opposite to said first end portion thereby causing swinging movement of said arm means around said pivot;
(h) arm bracket means secured to said curved plate holding frame and having a second end portion bent substantially parallel to said first end portion of said arm means, an extension line from said second bent portion also making an acute angle with the axis of said pivot, said arm bracket means having an elongated guide slot formed at said second end portion, said guide slot being adapted for guiding said guide pin on said arm means for movement along said slot; and
(i) curved plate guiding means for guiding the curved plate along a predetermined curved path defined thereby, so that as said arm means rotates, said curved plate holding frame is adapted to move substantially parallel to the curvature of the curved plate.

4. A device for moving a curved plate bent in a substantially arcuate-shape along a curved path comprising:

(a) a base panel;
(b) a curved plate holding frame for holding said curved plate, said frame being disposed in substantially parallel relation and predetermined spaced relation with said base panel and having a C-shaped cross section;

(c) a rotary shaft rotatably mounted on said base panel having a regulator handle secured at one end thereof and a pinion secured at the other end;

(d) a pivot mounted on said base panel with the axis thereof disposed in parallel with that of said rotary shaft;

(e) a lift arm pivotably mounted at an intermediate portion thereof on said pivot, said lift arm having a first end portion bent away from said curved plate at a predetermined angle, an extension line from said first end portion forming an acute angle with the axis of said pivot;

(f) a driven gear secured at the other end of said lift arm opposite to said first end portion and engaged with said pinion on said rotary shaft to transmit the rotation of said rotary shaft to said lift arm;

(g) a guide pin fixed to said first end portion of said lift arm and extending substantially perpendicular to said first end portion;

(h) a lift arm bracket secured to said curved plate holding frame and having a second end portion bent substantially parallel with said first end portion, an extension of said second end portion making an acute angle with the axis of said pivot, said lift arm bracket having at said second end portion an elongated guide slot for guiding said guide pin for movement along said slot;

(i) a spacer disposed around said guide pin and between said second end portion and said first end portion;

(j) a pair of guides disposed at the sides of the curved plate which define a predetermined curved path for the curved plate and direct the movement of the curved plate along said curved path, said guides comprising elastic members in sliding contact with the curved plate, so that as said lift arm rotates, said curved plate holding frame is adapted to move in substantially parallel to the curvature of the curved plate.

5. A device for moving a curved plate bent in a substantially arcuate-shape along a curved path comprising:

(a) a base panel;

(b) a curved plate holding frame for holding said curved plate, said frame being disposed in substantially parallel relation and predetermined spaced relation with said base panel, and having a C-shaped cross section;

(c) a rotary shaft rotatably mounted on said base panel having a regulator handle secured at one end thereof and a pinion secured at the other end;

(d) a pivot mounted on said base panel with the axis thereof disposed in parallel with that of said rotary shaft;

(e) a lift arm pivotably mounted at an intermediate portion thereof on said pivot, said lift arm having a first end portion bent away from said curved plate at a predetermined angle, an extension line from said first end portion making an acute angle with the axis of said pivot;

(f) a driven gear secured at the other end of said lift arm opposite to said first end portion and engaged with said pinion on said rotary shaft to transmit the rotation of said rotary shaft to said lift arm;

(g) a first guide pin fixed at said first end portion of said lift arm and extending toward said curved plate holding frame, said guide pin being substantially perpendicular to said first end portion;

(h) a connecting shaft rotatably and perpendicularly mounted to said lift arm at a point substantially intermediate said pivot and said first end portion;

(i) a first equalizer arm secured at the end to said connecting shaft facing said curved plate holding frame said first equalizer arm having a second end portion bent substantially parallel to said first end portion of said lift arm;

(j) a second equalizer arm secured at the other end of said connecting shaft facing said base panel, second equalizer arm extending in a direction opposite to and in alignment with said first equalizer arm and having a third end portion bent substantially parallel to said first end portion of said lift arm;

(k) a second guide pin secured at said second end portion of said first equalizer arm and extending substantially perpendicular thereto toward said base panel;

(l) a third guide pin secured at said third end portion of said second equalizer arm and extending substantially perpendicular thereto toward said base panel;

(m) an equalizer arm bracket secured at said base panel and having a first elongated guide slot formed substantially parallel to said second bent end portion of said first equalizer arm, said guide slot being adapted for guiding said third guide pin for movement therealong;

(n) a lift arm bracket secured at said curved plate holding frame and having a fourth end portion bent substantially parallel with said first end portion of said lift arm, an extension line of said fourth end portion making an acute angle with the axis of said pivot, said lift arm bracket having at said fourth end portion a second elongated guide slot for guiding said first guide pin on said lift arm for movement along said second slot and at the other end opposite to said fourth end portion having a third elongated guide slot for guiding said second guide pin on the first equalizer arm for movement along said third slot;

(o) spacers disposed around said first, second and third guide pins, respectively, and interposed respectively between said first end portion of said lift arm and said fourth end portion of said lift arm bracket; said second end portion of said first equalizer arm and lift arm bracket; and between said third end portion of the second equalizer arm and said equalizer arm bracket; and (p) a pair of guides disposed at the sides of the curved plate which define a predetermined curved path for the curved plate and direct the movement of the curved plate along said curved path, said guides comprising elastic members in sliding contact with the curved plate, so that as said arm means rotates, said curved plate holding frame is adapted to move in substantially parallel to the curvature of the curved plate.

* * * * *